April 9, 1940.  L. J. MEYER  2,196,444
NUT-CRACKING MACHINE
Filed Dec. 31, 1937  2 Sheets-Sheet 1
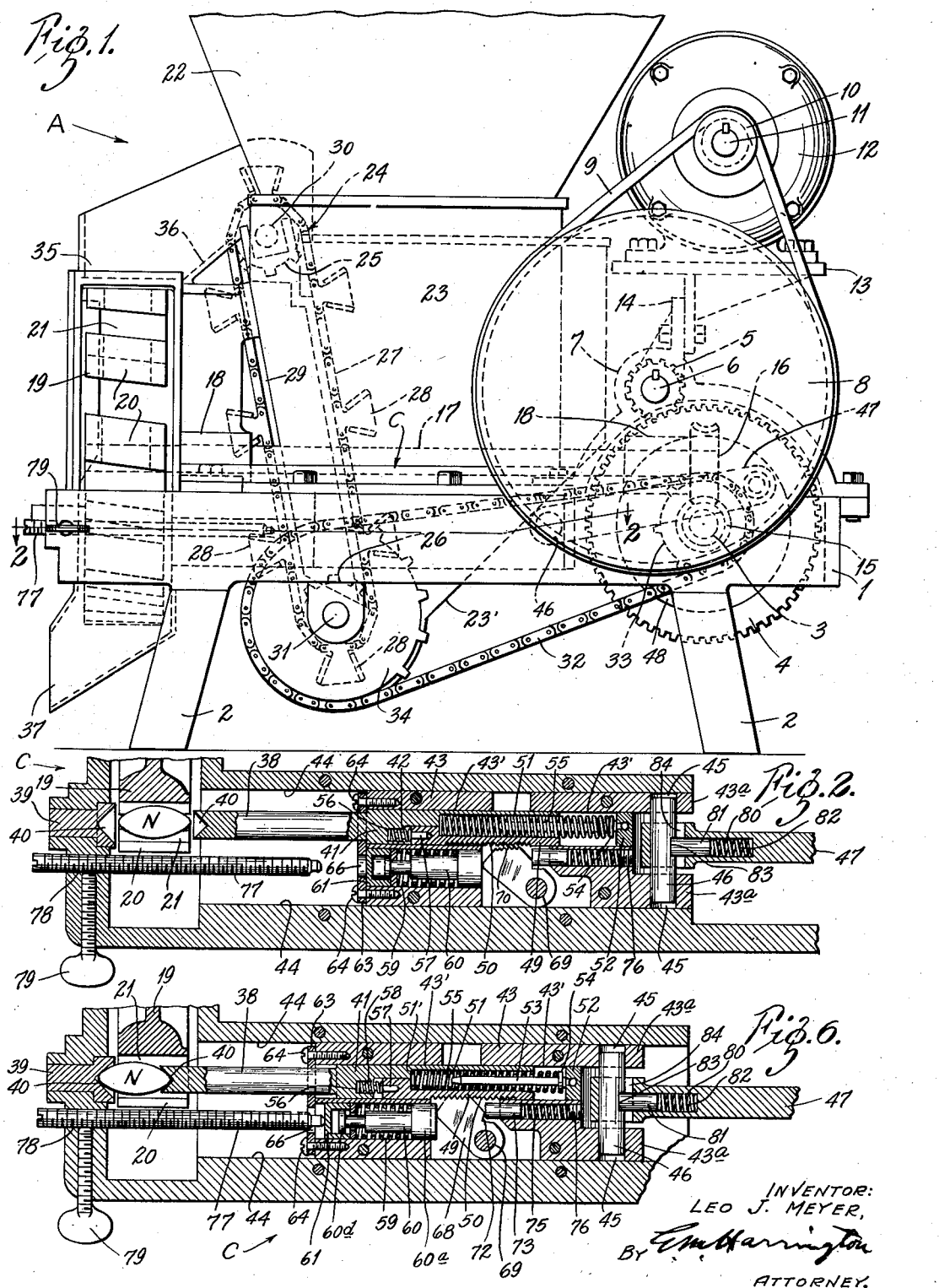
INVENTOR:
LEO J. MEYER,
BY *E. M. Harrington*
ATTORNEY.

April 9, 1940. L. J. MEYER 2,196,444
NUT-CRACKING MACHINE
Filed Dec. 31, 1937 2 Sheets-Sheet 2
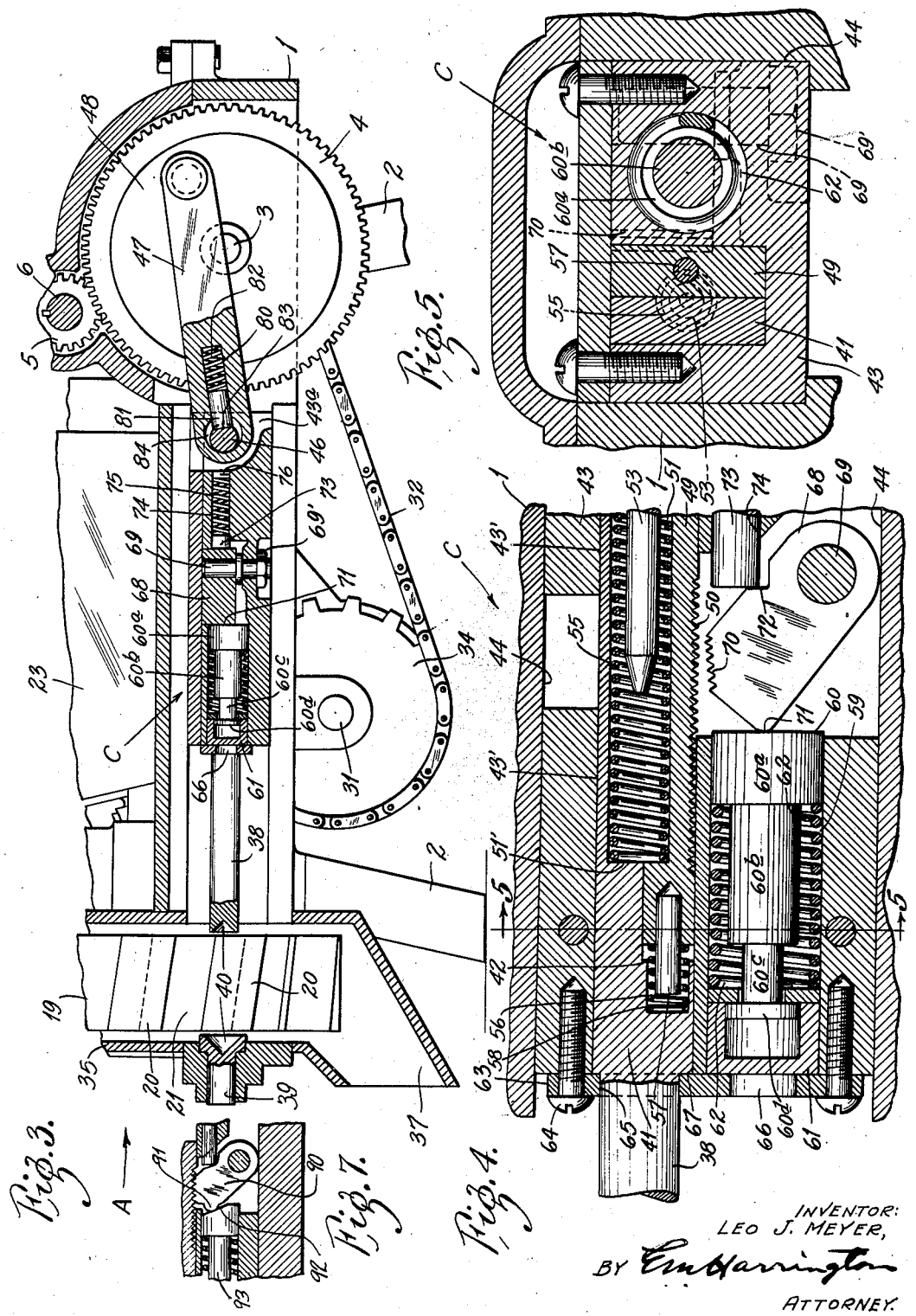

Patented Apr. 9, 1940

2,196,444

UNITED STATES PATENT OFFICE 2,196,444

NUT-CRACKING MACHINE

Leo J. Meyer, San Antonio, Tex., assignor to The Champion Pecan Machine Company, San Antonio, Tex., a corporation of Texas Application December 31, 1937, Serial No. 182,692

6 Claims. (Cl. 146—12)

This invention relates generally to nut-cracking machines of the type adapted to crack edible nuts and more specifically to such a machine which is provided with an improved compensating mechanism, or cracking box as it is frequently called, the predominant object of the invention being to provide a nut-cracking machine which includes as a part thereof a compensating mechanism, or cracking box, that is of such improved construction and arrangement that the efficiency of the nut-cracking machine is very greatly improved.

It is quite generally known that edible nuts, pecans, for instance, vary in size, particularly as to length. This situation makes it necessary that machines intended for use in cracking these nuts be provided with means for compensating for differences in the sizes of nuts to be cracked, for in the absence of such compensating mechanism, cracking movement of the nut-cracking dies of the machines which would be proper for medium size nuts would be too great for longer nuts and would crush the meats thereof, while in the case of shorter nuts such die movement would not be sufficient to properly crack the nuts. It has been the practice, therefore, to provide nut-cracking machines of the type to which this invention relates, with compensating mechanisms and the main purpose of this invention is to provide a nut-cracking machine which includes as a part thereof a compensating mechanism that is of greatly simplified construction and arrangement and which is capable of performing its intended function in a highly efficient manner.

Fig. 1 is a side elevation of a nut-cracking machine which includes as a part thereof the improved compensating mechanism disclosed herein.

Fig. 2 is an enlarged fragmentary section taken on line 2—2 of Fig. 1.

Fig. 3 is a fragmentary vertical section taken through the machine illustrated in Fig. 1, but on a larger scale.

Fig. 4 is an enlarged fragmentary horizontal section of a part of the compensating mechanism shown in Fig. 3.

Fig. 5 is a cross-section taken on the line 5—5 of Fig. 4.

Fig. 6 is a view similar to Fig. 2 but showing parts of the compensating mechanism in changed positions.

Fig. 7 is a fragmentary section showing a modified form of a part of the machine.

In the drawings, wherein are shown for the purpose of illustration, merely, two embodiments of the invention, A designates the nut-cracking machine generally.

The nut-cracking machine A includes a frame or bed 1 which is supported on suitable legs 2 and this frame or bed supports the various parts of the machine which will be hereinafter described. Extended transversely of the bed of the machine A adjacent to an end thereof is a main shaft 3 which is mounted for rotary movement in suitable bearings (not shown) supported by the bed of the machine. The main shaft 3 has fixedly mounted thereon a gear wheel 4 of the teeth of which are arranged to mesh with the teeth of a pinion 5 which is mounted on a shaft 6, said shaft 6 being mounted for rotation in a bearing 7 extended transversely of the machine above the bed thereof. Also mounted on the shaft 6 is a pulley 8, over which a power transmission belt 9 operates, this belt operating also over a smaller pulley 10 mounted on the power shaft 11 of an electric motor 12. The electric motor 12 is supported by suitable bracket means 13 which in turn is secured to a structure 14 of which the bearing 7 forms a part, the structure 14 being secured to and extended upwardly from the bed of the machine. It is obvious that rotary movement initiated by the motor 12 will be transmitted from the pulley 10 to the pulley 8 by the belt 9 so as to rotate the shaft 6 and thereby transmit rotary motion to the main shaft 3 of the machine through the pinion 5 and the gear wheel 4.

Fixedly mounted on the main shaft 3 of the machine A is a worm 15 with which a worm wheel 16 is arranged in mesh. The worm wheel 16 is mounted on a shaft 17 which extends longitudinally of the machine, said shaft being mounted for rotation in suitable bearings 18. At the end of the shaft 17 opposite to the end thereof at which the worm wheel 16 is mounted, a rotary nut-receiving member 19 is fixed to said shaft for rotary movement therewith. The rotary nut-receiving member 19 is constructed and arranged as disclosed in an application for United States Letters Patent filed in my name on October 21, 1935, Serial No. 45,875, which became Patent No. 2,128,874, on August 30, 1938, and therefore it will not be necessary to describe in detail herein the construction and arrangement of said rotary nut-receiving member. All that need be known for a complete understanding of the present disclosure is that the rotary nut-receiving member 19 includes outwardly extended and circumferentially spaced portions 20 each of which is provided with a nut receiving pocket 21. It is important to note, however, that the nut-receiving pockets 21 are not parallel with respect to the axis of the shaft 17, but instead said pockets are extended longitudinally at a slight angle relative to the axis of the shaft 17 as shown to the best advantage in Figs. 1 and 3.

The nut-cracking machine A includes a hopper which receives nuts to be cracked by the machine, said hopper including a tapered upper portion 22 which communicates with a lower hopper portion 23 that is provided with an inclined lower wall 23' which leads to a curved bottom portion of the hopper. An endless conveyor 24 is arranged at an end wall of the hopper portion 23, said endless conveyor comprising upper and lower sprocket wheels 25 and 26 over which operates a sprocket chain 27 that is provided with spaced nut-receiving elements 28. It is to be noted that one flight of the endless sprocket chain 27 of the conveyor 24 moves upwardly within the hopper portion 23 in contact with the inner face of the end wall 29 thereof, and that the other flight of said sprocket chain moves downwardly in a position outside of said hopper portion. The upper sprocket wheel 25 of the endless conveyor is fixed to a shaft 30 which is mounted in suitable bearings (not shown) and the lower sprocket wheel 26 is mounted on a shaft 31 which likewise is supported by suitable bearing means (not shown). The sprocket chain 27 of the conveyor 24 receives its movement through the instrumentality of a sprocket chain 32 which operates over sprocket wheels 33 and 34 mounted on the shafts 3 and 31, respectively.

The rotary nut-receiving member 19 is disposed within a housing 35 which includes an upper inclined wall 36 and a lower discharge chute 37. In the operation of the machine illustrated in the drawings each nut-receiving element 28 of the endless conveyor 24 picks up a nut as said nut-receiving element passes upwardly through the hopper of the machine, wherein a store of nuts is maintained. As each nut-receiving element 28 passes over the upper sprocket wheel 25 the nut carried thereby is discharged therefrom onto the inclined wall 36, said nut sliding down said inclined wall into the main portion of the housing 35 of the rotary nut-receiving member 19 where said nut is received by a pocket of said rotary nut-receiving member. The rotary nut-receiving member 19 is constantly rotated during operation of the machine and the nut so deposited in a pocket thereof is carried around by the nut receiving member, said nut being cracked during its travel with the nut-receiving member in a manner to be hereinafter explained, and being thereafter discharged in a cracked condition from the discharge chute 37.

The nut-cracking machine A includes as a part thereof an improved compensating mechanism which provides for the same cracking pressure being applied to various nuts, even though they are of different lengths. This compensating mechanism is shown in Figs. 2 to 6, inclusive, wherein the compensating mechanism is designated generally by the reference character C. The compensating mechanism C comprises a movable die 38, which is movable toward and from a fixed die 39, said fixed die being supported by a stationary part of the machine. The dies 38 and 39 are provided with nut-receiving cavities 40 formed in their nut-contacting faces.

The movable die 38 comprises a forward extension of a bar 41 which is of its full width at its extreme forward end portion and is reduced to approximately one-half of its full width throughout its rear portion, the rear portion of said bar which is of reduced width extending from a shoulder 42 of the bar to the rear end thereof. The bar 41 is supported by a carriage 43, said carriage being provided with alined openings 43' in its front and rear portions in which the bar 41 is arranged for sliding movement. The carriage 43 in turn is supported for reciprocatory movement in a guideway 44 provided by a portion of the bed of the machine. The carriage 43 adjacent to its rear end is provided with apertures 45 which are formed in spaced apart portions 43ª of said carriage (see Figs. 2 and 6) and these apertures receive the opposite end portions of a pin 46, said pin serving to operably connect to said carriage an end of a link 47 whose opposite end is pivotally connected to a disk 48 fixedly mounted on the shaft 3 whereby rotary movement of the disk 48 will subject the carriage to reciprocatory movement.

Disposed in the cavity provided in the rear portion of the bar 41 where the width of said bar is reduced is a die-locking member 49 in the form of a bar, said member having serrations or teeth 50 formed at a face thereof. The bar 41 and the die-locking member 49 have each formed therein an elongated semicircular opening which, when said bar and die-locking member are assembled side by side, produce an elongated opening 51, circular in cross-section which extends from the shoulders 51' of said bar and die-locking member to the rear ends of said parts. The carriage 43 includes a fixed transversely extended element 52 that supports a rod 53 which extends forwardly from said element 52 into the opening 51 formed in the bar 41 and die-locking member 49. The rod 53 has a flange 54 formed thereon and abutting against said flange is an end of a coil spring 55. The coil spring 55 surrounds the rod 53 and the end thereof opposite to the end that abuts against the flange 54, contacts with and bears against the shoulders 51' at the forward end of the opening 51 in which the forward portion of the coil spring is disposed. The bar 41 has an opening 56 formed therein which is open at its rear end at the shoulder 42 of said bar, said opening receiving a pin 57 which is carried by the die-locking member 49 and extends forwardly from the forward end of said die-locking member. The pin 57 is surrounded by a coil spring 58, one end of said coil spring contacting with the forward face of the die-locking member 49 and the opposite end of said coil spring contacting with the forward end wall of the opening 56.

Formed in the forward portion of the carriage 43 is an opening 59 in which a plunger 60 is disposed for sliding movement, said plunger including a rear head portion 60ª, a forwardly extended portion 60ᵇ located immediately adjacent to said rear head portion 60ª, a portion 60ᶜ of reduced diameter extended forwardly from said portion 60ᵇ, and a forward head portion 60ᵈ of slightly greater diameter than said portion 60ᶜ. The forward head portion 60ᵈ of the plunger 60 is located within a hollow cylindrical element 61, said element 61 being made up of one integral part which comprises the circumferential wall and the forward wall of the element, and another part which provides the rear wall of said element and has an opening formed therethrough through which the portion 60ᶜ of the plunger extends. The circumferential faces of the rear head portion 60ª of the plunger 60 and the hollow cylindrical element 61 are in close, sliding contact with the wall of the opening 59, and a coil spring 62 is arranged within said opening 59 so that it surrounds the portions 60ᵇ and 60ᶜ of the plunger, the opposite ends of said coil spring 62 contacting with the forward face of the rear head portion 60ᵃ of the plunger 60 and the rear face of the rear wall of the hollow, cylindrical element 61 respectively. At the forward end of the carriage 43 a plate 63 is secured thereto by suitable fastening devices 64, said plate being provided with an opening 65 through which the movable die 38 passes, and an opening 66 which is in alinement with respect to the axis of the plunger 60. It is to be noted that where the movable die 38 is joined to the bar 41 a shoulder 67 is produced and this shoulder contacts with the rear face of the plate 63 whereby forward movement of the bar and movable die relative to the carriage 43 is limited. Also the inner face of the plate 63 serves as an abutment which limits forward movement of the cylindrical element 61.

Located to the immediate rear of the plunger 60 is a locking element 68 which is pivotally supported by the carriage 43 in an open space provided therefor between the forward and rear portions of said carriage. The pivotal support for the locking element is obtained through the use of a vertically disposed pivot pin 69 which passes through an opening formed through the locking element and is secured to a portion of the carriage 43 by a nut 69′ as shown in Fig. 3. The locking element is provided with a toothed or serrated face 70 which, as will presently appear herein, is adapted to be moved into contact with the teeth or serrations 50 of the movable die-locking member 49, and said locking element contacts at 71 with the rear head portion 60ᵃ of the plunger 60. The locking element 68 is provided with a notch which provides a shoulder 72 and arranged in contact with said shoulder is a plunger 73 which is arranged in an opening 74 formed in the rear portion of the carriage 43. The plunger 73 is forced forwardly within the opening 74 by a coil spring 75 which is located within said opening 74 with its opposite ends in contact with the plunger 73 and a screw 76 arranged in the rear portion of said opening, and because the forward end face of the plunger 73 contacts with the locking element said locking element will be maintained at all times in contact with the head portion 60ᵃ of the plunger 60.

The machine A includes an elongated element 77 which is screwthreaded throughout most of its length as shown to the best advantage in Figs. 2 and 6. This element is mounted in a screwthreaded opening 78 formed through a portion of the housing 35 of the rotary nut-receiving member 19 of the machine and by rotating said element it may be adjusted longitudinally of the machine to position the rear end of said element in desired positions. As shown in Figs. 2 and 6 the elongated element 77 is located in alinement with the opening 66 of the forward plate 63 of the carriage 43 for a purpose to be hereinafter set forth. A set screw 79 is provided by means of which the elongated element 77 may be locked in positions to which it may be adjusted.

In the operation of the machine, the nuts to be cracked are carried around in the pockets 21 of the rotary nut-receiving member 19, which is subjected to constant rotation during operation of the machine. As each pocket 21 approaches the nut cracking position it passes between the adjacent ends of the movable die 38 and the fixed die 39 as shown to the best advantage in Fig. 2 wherein a nut to be cracked is illustrated and is designated by the reference character N. As the nut to be cracked approaches the cracking position the entire compensating mechanism is moving forwardly as a unit and eventually the forward end of the movable die 38 contacts with the nut to be cracked and moves said nut into contact also with the fixed die 39, the inclined arrangement of the pocket 21 permitting the movable die 38 to move into said pocket while the rotary nut-receiving member 19 is rotating. The position of the nut between the dies 38 and 39 arrests further movement of the movable die 38, but the carriage 43 of the compensating mechanism with the parts associated therewith continues its forward movement in response to rotation of the disk 48 on the shaft 3 to which the carriage is operably connected by the link 47. During such forward movement of the carriage with respect to the movable die 38 the coil spring 55 is compressed, and when the carriage has moved the proper distance forwardly the end portion of the screw-threaded element 77 enters the opening 66 in the forward plate 63 of the carriage to contact with the forward face of the hollow element 61.

When the machine reaches this phase of its operation forward movement of the carriage continues, as reciprocatory movement of said carriage is continuous during operation of the machine, but contact between the forward end of the screw-threaded element 77 and the element 61 arrests forward movement of the plunger 60 with the carriage 43. Now, as the forward movement of the carriage continues the pivot 69 of the locking element 68, which moves forwardly with the carriage, moves toward the rear end face of the arrested plunger 60 with the result that said locking element is moved about its pivot 69 in such manner as to move the teeth of said locking element into mesh with the teeth of the locking member 49. This locking of the locking element and the locking member occurs when only a very slight amount of forward movement of the carriage remains, and when the teeth of the locking element 68 and the teeth of the locking member 49 have become engaged the movable die 38 is positively locked to the carriage 43. The forward movement of the carriage continues after the movable die has been locked to the carriage and during the final slight forward movement of the carriage the movable die 38 cracks the shell of the nut interposed between the movable die 38 and the fixed die 39. When the carriage moves forwardly the final distance to crack the nut as described the plunger 60 moves forwardly with the carriage due to the fact that the locking element 68 is in contact with said plunger. However the cylindrical element 61 at this time is held stationary by the screwthreaded element 77 and the forward head portion 60ᵈ of said plunger moves forwardly a slight distance within said cylindrical element against the action of the coil spring 62. Obviously the coil spring 62 is not compressed when the locking element 68 is moved into die-locking contact with the locking member 49 because said coil spring 62 is heavier than the coil spring 75 which resists locking movement of the locking element 68.

When a nut is cracked as described the carriage continuing its continuous reciprocatory movement moves rearwardly thereby moving the movable die rearwardly from the fixed die. Continued rotation of the rotary nut-receiving member 19 causes the cracked nut to drop into the chute 37 and be discharged thereby from the machine.

It is obvious, therefore, that regardless of the lengths of the nuts being cracked, each nut will be subjected to the same cracking pressure. In the case of a longer nut the movable die 38 will be arrested in its forward movement earlier, while in the case of a shorter nut forward movement of the movable die will be arrested later. However, as already stated every nut regardless of its length will receive the shell-cracking pressure required to properly crack the shell of the nut.

It will be noted that the coil spring 58 provides for the yieldable support of the locking member 49. Thus, when the teeth 70 of the locking element 68 are moved into mesh with the teeth 50 of the locking member 49 said locking member may move forwardly a slight distance against the action of the coil spring 58, if required, to permit said teeth 70 and 50 to mesh properly.

Also to yieldably attach the carriage 43 to the link 47 said link is provided with an opening 80 in which is mounted a plunger 81 that is urged outwardly by a coil spring 82, said plunger being arranged in contact with a flat face 83 formed on the pin 46. Because of this arrangement the machine is protected against breakage of parts thereof in the event a stone or piece of metal, or other article of hard foreign matter finds its way between the cracking dies 38 and 39. In this event the disk 48 on the shaft 3 would continue to rotate and when the forward movement is arrested by the non-crackable article between the cracking dies, the coil spring 82 will yield as the link 47 moves through its final forward movement during which the cracking action ordinarily is performed. In order to permit the link 47 to move forwardly in the situation suggested the opening 84 in the forward end of the link is considerably larger in diameter than the pin 46. The coil spring 82 is of such stiffness that it will not yield when an ordinary nut-cracking operation is being performed by the machine.

If desired the locking element may be shaped as shown in Fig. 7 wherein said locking element is designated by the reference character 90, said locking element 90 being provided with an extension 91 having a curved face which contacts with an inclined face 92 formed at the rear end of the plunger 93.

I claim:

1. A nut cracking machine comprising a frame, a carriage adapted for reciprocatory movement with respect to said frame, a compensating member carried by said carriage for movement therewith and capable of independent movement with respect thereto, a nut cracking element associated with said compensating member, a second nut cracking element toward which the first-mentioned nut cracking element is movable, and means whereby independent movement of said compensating member with respect to said carriage may be prevented, said means comprising a locking member associated with said compensating member and movable therewith, a movable locking element pivotally supported by said carriage for movement therewith at all times and normally maintained out of locking relation with respect to said locking member, and means for moving said locking element into locking relation with respect to said locking member so as to lock said locking member and compensating member with respect to said carriage, said means for moving said locking element into locking relation with respect to said locking member comprising a part supported for straight line movement in contact with said locking element, and a spring which permits said part to yield in response to pressure thereagainst by said locking element.

2. A nut cracking machine comprising a frame, a carriage adapted for reciprocatory movement with respect to said frame, a compensating member slidingly supported by said carriage for movement therewith, a nut cracking element associated with said compensating member, a second nut cracking element toward which the first-mentioned nut cracking element is movable, and means whereby independent movement of said compensating member with respect to said carriage may be prevented, said means comprising a locking member associated with said compensating member and movable therewith, said locking member being provided with a serrated face, a locking element movably supported by said carriage for movement therewith at all times and having a serrated face, and means for moving said locking element so as to cause the serrated face thereof to engage the serrated face of said locking member and thereby lock said locking member and said compensating member with respect to said carriage, said means for moving said locking element into locking relation with respect to said locking member comprising a plunger supported for straight line movement in contact with said locking element, and a spring which permits said plunger to yield in response to pressure thereagainst by said locking element.

3. A nut cracking machine comprising a frame, a carriage adapted for reciprocatory movement with respect to said frame, a compensating member slidingly supported by said carriage for movement therewith, a nut cracking element associated with said compensating member, a second nut cracking element toward which the first-mentioned nut cracking element is movable, and means whereby independent movement of said compensating member with respect to said carriage may be prevented, said means comprising a locking member associated with said compensating member and movable therewith, said locking member being provided with a serrated face, a locking element movably supported for pivotal action by said carriage for movement therewith at all times and having a serrated face, a spring-urged part for urging said locking element out of locking relation with respect to said locking member, and means for moving said locking element so as to cause the serrated face thereof to engage the serrated face of said locking member and thereby lock said locking member and said compensating member with respect to said carriage, said means for moving said locking element into locking relation with respect to said locking member comprising a plunger supported for straight line movement in contact with said locking element, and a spring which permits said plunger to yield in response to pressure thereagainst by said locking element.

4. A nut cracking machine comprising a frame, a carriage adapted for reciprocatory movement with respect to said frame, a compensating member slidingly supported by said carriage for movement therewith, a nut cracking element associated with said compensating member, a second nut cracking element toward which the first-mentioned nut cracking element is movable, and means whereby independent movement of said compensating member with respect to said carriage may be prevented, said means comprising a locking member associated with said compensating member and movable therewith, said locking member being provided with a serrated face, a locking element pivotally supported by said carriage for movement therewith at all times and having a serrated face, and means slidingly supported by said carriage and adapted to be engaged by a fixed and stationary part of the machine for moving said locking element so as to cause the serrated face thereof to engage the serrated face of said locking member and thereby lock said locking member and said compensating member with respect to said carriage, and a spring which permits said slidingly supported means to yield in response to pressure thereagainst by said locking element.

5. A nut cracking machine comprising a frame, a carriage adapted for reciprocatory movement with respect to said frame, a compensating member slidingly supported by said carriage for movement therewith, a nut cracking element associated with said compensating member, a second nut cracking element toward which the first-mentioned nut cracking element is movable, and means whereby independent movement of said compensating member with respect to said carriage may be prevented, said means comprising a locking member associated with said compensating member and movable therewith, said locking member being provided with a serrated face, a locking element pivotally supported by said carriage for movement therewith at all times and having a serrated face, and means slidingly supported by said carriage and adapted to be engaged by a fixed part of the machine for moving said locking element so as to cause the serrated face thereof to engage the serrated face of said locking member and thereby lock said locking member and said compensating member with respect to said carriage, said slidably supported means comprising a plunger arranged in engagement with a part of said locking element, a cylindrical element arranged in telescoping relation with respect to an end portion of said plunger, and a coil spring interposed between a part of said plunger and said cylindrical element which permits said plunger to yield in response to pressure thereagainst by said locking element.

6. A nut cracking machine comprising a frame, a carriage adapted for reciprocatory movement with respect to said frame, a compensating member slidingly supported by said carriage for movement therewith, a nut cracking element associated with said compensating member, a second nut cracking element toward which the first-mentioned nut cracking element is movable, and means whereby independent movement of said compensating member with respect to said carriage may be prevented, said means comprising a locking member associated with said compensating member and movable therewith, said locking member being provided with a serrated face, a locking element pivotally supported by said carriage for movement therewith at all times and having a serrated face, means slidingly supported by said carriage and adapted to be engaged by a fixed part of the machine for moving said locking element so as to cause the serrated face thereof to engage the serrated face of said locking member and thereby lock said locking member and said compensating member with respect to said carriage, said slidably supported means comprising a plunger arranged in engagement with a part of said locking element, a cylindrical element arranged in telescoping relation with respect to an end portion of said plunger, and a coil spring interposed between a part of said plunger and said cylindrical element which permits said plunger to yield in response to pressure thereagainst by said locking element, and spring means adapted to resist movement of the locking element to the locking position.

LEO J. MEYER.